United States Patent [19]

Nakasone et al.

[11] Patent Number: 4,770,834
[45] Date of Patent: Sep. 13, 1988

[54] METHOD FOR CONTINUOUS MOLDING OF A ROD-LIKE PRODUCT

[75] Inventors: Takayoshi Nakasone, Gifu; Yoji Ida, Motosu; Kazuo Yasuda, Gifu, all of Japan

[73] Assignee: Ube-Nitto Kasei Co., Ltd., Tokyo, Japan

[21] Appl. No.: 919,211

[22] Filed: Oct. 15, 1986

[30] Foreign Application Priority Data

Oct. 16, 1985 [JP] Japan .................. 60-228894

[51] Int. Cl.⁴ .......................................... B29C 35/06
[52] U.S. Cl. ...................... 264/127; 156/180; 156/244.13; 156/244.27; 264/130; 264/135; 264/136; 264/137; 264/174; 264/236; 264/347
[58] Field of Search .............. 264/127, 37, 136, 130, 264/137, DIG. 44, 174, 135, 236, 347, 317; 425/113, 445; 156/244.12-244.17, 244.27, 178, 180

[56] References Cited

U.S. PATENT DOCUMENTS

| | | | |
|---|---|---|---|
| 3,529,050 | 9/1970 | Smith | 264/137 |
| 3,556,888 | 1/1971 | Goldsworthy | 156/180 |
| 3,856,446 | 12/1974 | Schultz | 425/113 |
| 3,993,726 | 11/1976 | Moyer | 264/209.4 |
| 4,056,596 | 11/1977 | Pahl | 264/37 |
| 4,515,737 | 5/1985 | Karino et al. | 264/137 |
| 4,559,095 | 12/1985 | Babbin | 156/244.24 |

FOREIGN PATENT DOCUMENTS

| | | | |
|---|---|---|---|
| 566876 | 12/1958 | Canada | 425/113 |
| 47-35544 | 9/1972 | Japan | 264/136 |
| 56-20188 | 5/1981 | Japan . | |
| 56-117623 | 9/1981 | Japan | 264/137 |
| 59-174338 | 10/1984 | Japan | 264/236 |

Primary Examiner—Jeffery Thurlow
Attorney, Agent, or Firm—Wenderoth, Lind & Ponack

[57] ABSTRACT

A method of continuous molding a rod-like product includes forming an uncured rod-like molding by passing reinforcing fibers impregnated with uncured thermosetting resin through a squeezing die having a predetermined shape. Molten thermoplastic fluororesin is extruded in a ring shape to enclose the rod-like molding. A sheathing layer of the thermoplastic resin is formed by causing the thermoplastic resin to come into contact with the outer periphery of the uncured rod-like molding and by cooling and solidifying the thermoplastic resin. The uncured rod-like molding and the sheathing layer are introduced into a heated tank thereby hardening the thermosetting resin. The sheathing layer is stripped from the molding to form a rod-like product having a surface of fiber reinforced thermosetting resin.

2 Claims, 2 Drawing Sheets

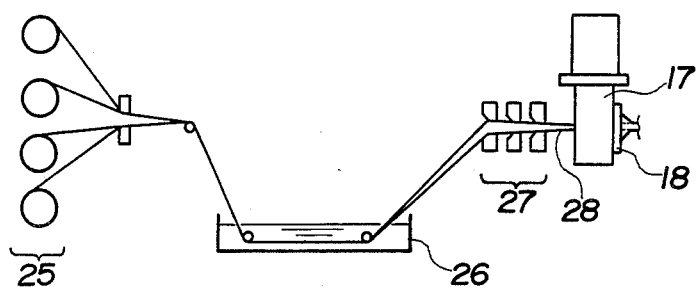
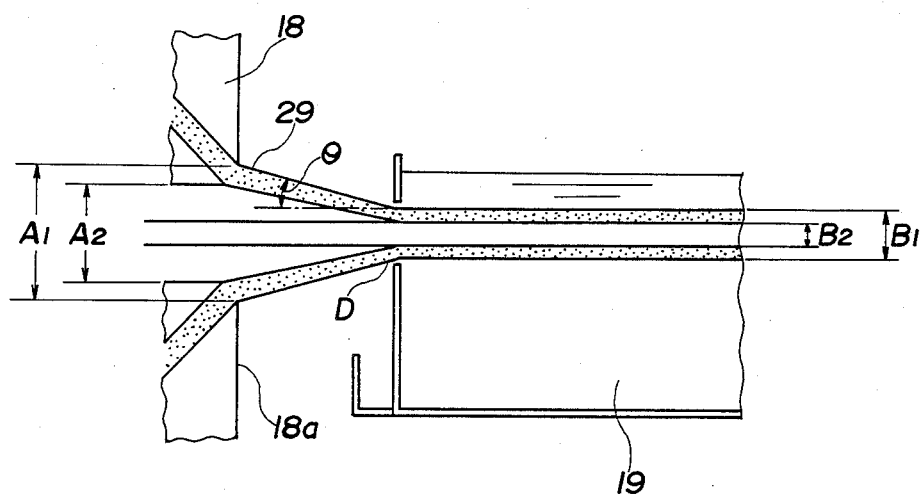

METHOD FOR CONTINUOUS MOLDING OF A ROD-LIKE PRODUCT

BACKGROUND OF THE INVENTION

This invention relates to a method for continuously molding a rod-like product including fiber reinforced thermosetting resin and particularly to a molding method for a rod-like product having an outer diameter of less than about 5 mm.

Rod-like products formed of fiber reinforced thermosetting resin (FRP) are extensively used, for example, for structural material and in the electrical field, and especially their application to optical communication systems has recently attracted much attention. Optical fiber cords formed by sheathing optical fiber elements, which are formed by enclosing optical fibers with buffer layers, with fiber reinforced thermosetting resin, and tension members consisting of FRP rod-like products for making such optical fiber elements into a cable, are put to practical use.

FRP rod-like products have typically been manufactured by a so-called continuous pultrusion method wherein reinforced fibers such as glass fibers impregnated with uncured thermosetting resin are pulled through a squeezing die so as to remove excessive resin, and then through a heated die so as to harden the resin while forming it into a predetermined shape. According to this method, if the resin is completely hardened in the die, residual resin adhering to the inside of the die impairs the smoothness of the product surface and increases the drawing load such that in some cases it is impossible to proceed with the drawing operation. Therefore, the resin is actually subjected to preliminary curing in the die and further introduced into a curing tank for a final hardening process. However, it is very difficult to control the curing in the die to the extent that the products will not be deformed in the curing tank, and thus this method is not always satisfactory with respect to efficiency of continuous molding and to dimensional accuracy. Since the foregoing problems become more serious and it gets more difficult to improve the dimensional accuracy of the dies as the diameter of the product decreases, and particularly since a slight dimensional error in the optical fiber cable significantly affects transmission loss, it is impossible to manufacture lengthy optical fiber products particularly of extremely small diameter by the continuous pultrusion method.

Another method of molding continuously FRP rod-like products is described in Japanese Patent Publication No. 56-20188. This method involves sheathing an outer surface of an uncured rod-like molding with molten thermoplastic resin, cooling and solidifying this sheathing layer, and then hardening the inner thermosetting resin in a heating tank. Since the sheathing layer acts as a kind of die during the curing process, this method has an advantage that it enables relatively high speed manufacture. The resultant product necessarily includes the sheathing layer of thermoplastic resin, which, however, constitutes an impediment to high density of and decrease in diameter of an optical fiber cable which is formed by combining a plurality of the optical fiber cords formed by sheathing the optical fiber element with such product, because in making a plurality of the optical fiber cords into the cable, the sheathing layer which does not contribute to the tensile strength of the cable, takes up a rather large space.

Further, when a cable duct holding the optical fiber cords is used as an overhead earth-wire, the thermoplastic resin of the sheathing layer would melt upon the occurrence of a short-circuit accident such as lightning or the like, so as to flow and accumulate in the duct, which would constitute an impediment to re-laying a new cord in the same duct. Therefore, this product is still unsatisfactory for application in an optical fiber cable.

The present invention has been made in view of the above problems, and it is therefore an object of the present invention to provide a method for continuous molding of a rod-like product including fiber-reinforced thermosetting resin and particularly having an outer diameter of less than about 5 mm, which method may attain both excellent productivity and dimensional accuracy.

Another object of the present invention is to provide a method for continuous molding of a rod-like product particularly suitable for application to optical fibers.

A further object of the present invention is to provide a low-cost method for continuous molding of a rod-like product.

SUMMARY OF THE INVENTION

According to the present invention, method for continuous molding of a rod-like product includes the steps of: forming an uncured rod-like molding by passing reinforcing fibers impregnated with uncured thermosetting resin through a squeezing die having a predetermined shape; extruding molten thermoplastic fluororesin in a ring shape in such a manner as to enclose the uncured rod-like molding; forming a sheathing layer of the thermoplastic fluororesin by causing the thermoplastic fluororesin to come into contact with the outer periphery of the uncured rod-like molding and by cooling and solidifying the thermoplastic fluororesin; introducing the uncured rod-like molding having the sheathing layer into a heated tank to thereby harden the inner thermosetting resin; and stripping away the sheathing layer to form a rod-like product having a surface of fiber reinforced thermosetting resin.

Preferably, the thermoplastic fluororesin comes into contact with the thermosetting resin at an angle between 5° and 30°, and the cooling of the thermoplastic begins substantially at the contact point thereof with the uncured rod-like molding.

The thickness of the sheathing layer depends on the diameter of the uncured rod-like molding and the type of thermoplastic fluororesin to be used, however, the sheathing layer is preferably formed to have a thickness of 0.07 mm to 0.6 mm.

Other objects, features and advantages of the present invention will become apparent from the following detailed description thereof.

BRIEF DESCRIPTION OF THE DRAWINGS

FIGS. 1 and 2 are schematic views illustrating a method of continuous molding of a rod-like product according to the present invention; and FIG. 3 is a fragmentary enlarged view illustrating a sheathing process, according to the present invention, with fluororesin.

DETAILED DESCRIPTION OF THE INVENTION

Figure 1:
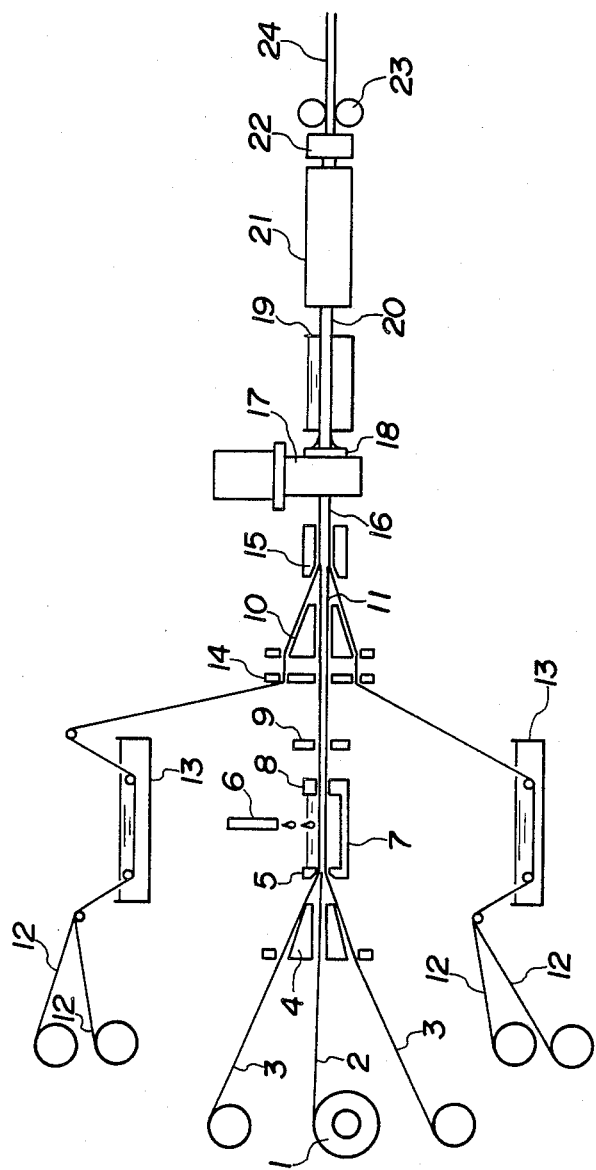

Preferred embodiments of the present invention will be described in detail hereinafter.

A method according to the present invention starts with steps of bundling numerous long reinforcing fibers fed from a bobbin or the like, and then impregnating them with uncured thermosetting resin. Glass fibers are the most typical reinforcing fibers but other types of fiber such as carbon, ceramic, aromatic polyamide, polyester, and vinylon may be used. Examples of the thermosetting resin are various unsaturated polyester resins which are made of unsaturated alkyd resin and various polymeric monomers. Other epoxy of phenolic thermosetting resins likewise may be used if they have little chemical affinity and wetability with thermoplastic fluororesins described hereinafter. When the present method is employed in forming an optical fiber cord, optical fiber elements may be fed continuously so as to be disposed at the center of the reinforcing fibers.

Next, the reinforcing fiber bundle impregnated with the uncured resin is led through squeezing dies having predetermined cross sections so as to shape an uncured rod-like molding by squeezing therefrom excessive resin. Usually plural squeezing dies are disposed continuously in the direction of travel of the fiber bundle. The thus formed uncured rod-like molding is led through an extruding die which extrudes a molten thermoplastic resin in a ring or annular tube shape around the rod-like molding in such a manner as to enclose the same, and then through a water tank so that the thermoplastic resin is cooled and solidifed to form a sheathing layer around the uncured rod-like molding. According to the present invention, this thermoplastic resin forming the sheathing layer is selected from a group consisting of fluororesins which are capable of being extrusion molded. Fluororesins are used in the present invention because they have little chemical affinity with the uncured thermosetting resin, which facilitates a stripping process described hereinafter, and because, due to their heat-resistance, the sheathing layer made of fluororesin can maintain its predetermined shape during a heating process for the thermosetting resin described hereinafter. Examples of fluororesins are polyvinylidene fluoride (PVDF), ethylene-tetrafluoroethylene (ETFE) copolymer, polyvinylfluoride (PVF), fluorinated ethylene propylene (FEP) copolymer, polychlorotrifluoroethylene (PCTFE), ethylene-chlorotrifluoroethylene (ECTFE) copolymer, perfluoroalkoxy (PFA) resin and fluorinated ethylene-propylene ether (EPE) resin.

The ring or tube of the molten resin, as being extruded from the die, decreases in thickness and diameter and comes into contact with the outer surface of the uncured rod-like molding at a predetermined angle. This angle is preferably preset in a range of 5° to 30°, most preferably 5° to 15°. When the contact angle exceeds 30°, during a cooling and solidifying process after the thermoplastic resin has come into contact with the uncured rod-like molding, the rate of squeezing thereby of the uncured thermosetting resin tends to vary which sometimes results in an inferior surface finish of a cured rod-like product. On the other hand, when the angle is less than 5°, the distance between the point where the molten resin is extruded and the point where it comes into contact with the uncured rod-like molding becomes so long that curing of the rod-like molding tends to be started by heat radiation from the molten resin.

According to the present invention, it is preferable to start the cooling step of the molten resin immediately after it has come into contact with the uncured rod-like molding. Otherwise, problems would often ensue such as dimensional inaccuracy and an abnormally bumpy surface of a rod-like molding after it has been cured as described hereinafter. Since the thermoplastic resin contracts while solidifying in the cooling process, it acts as if it squeezes slightly the liquid uncured thermosetting resin in the rod-like molding. Also, since this thermosetting resin has little chemical affinity and wetability with fluororesin, the thermosetting resin condenses at the outer area of the uncured rod-like molding, which is indispensable for obtaining a smooth surface of a final product. The sheathing layer formed of the solidified thermoplastic resin preferably has a thickness of about 0.07 to 0.6 mm, most preferably 0.1 to 0.3 mm. If the thickness is greater than 0.6 mm, a final product frequently has an uneven surface which appears to be caused by a partial cure of the thermosetting resin, probably due to substantial heat radiation from the molten resin before the molten resin comes into contact with the thermosetting resin. When the thickness is less than 0.07 mm, on the other hand, pinholes and the like tend to be formed, resulting in an inferior property of a part of the final product. Accordingly, draft rate and draft balance between the inner and outer diameters of the dies and sheathing layer which will be described in detail hereinafter, should be determined so that the thickness of the sheathing layer will be 0.07 mm to 0.6 mm.

The uncured rod-like molding thus formed with the sheathing layer is consecutively led through a heated curing tank where the inner thermosetting resin is hardened. During this process, the sheathing layer acts as a kind of die so as to prevent deformation of the inner rod-like molding. After the thermosetting resin has been completely hardened, the FRP rod-like molding with the sheathing layer is pulled out of the curing tank, and the sheathing layer is then stripped off so that the FRP surface is exposed. Thereafter, the FRP molding is wound on a drum as a final product. The stripping of the sheathing layer can be consecutively executed by, for example, a stripping device with a sharp cutting edge, and the sheathing layer formed of the fluororesin can be smoothly stripped from the FRP surface. It is proved by an experiment that the thus formed FRP rod-like product has high dimensional accuracy and an excellently smooth surface.

According to the method of the present invention, the FRP rod-like product can be produced continuously with a production speed two to three times as efficient as the conventional continuous pultrusion method, and hence productivity is remarkably improved. Further, the present method is particularly suitable to the manufacture of a rod-like product having a small diameter and required to have a smooth surface and high dimensional accuracy. Since the thermoplastic fluororesins, although generally being costly, can be reused after being stripped from the cured rod-like molding, the manufacturing cost is not significantly increased.

Further advantages of the present invention will be apparent from the following description of examples and a comparative example in conjunction with the accompanying drawings.

EXAMPLE 1

Referring to FIG. 1, a bobbin 1 feeds a multiple-core optical fiber unit 2 having an outer diameter of 1.2 mm, which unit was formed by stranding seven optical fiber elements each of which was made up of an optical fiber of quartz glass (50 μm core diameter and 125 μm clad diameter) and a buffer layer of silicone rubber sheathing the optical fiber. Reinforcing glass fibers 3 composed of long monofilaments each of about 10 μm in diameter and 80 tex, were supplied from other bobbins and converged through a guide 4 so that they were arranged longitudinally around the outer surface of the optical fiber unit 2. The assembly of the optical fiber unit 2 and reinforcing glass fibers 3 was, immediately after being compacted into a bundle 1.70 mm in diameter by an inlet guide 5, led through a resin tank 7 into which unsaturated polyester resin containing non-styrene polymeric monomer was supplied in drops from a pipe 6 and in which the resin was impregnated through the outer surface of the fibers. The fiber bundle impregnated with uncured thermosetting resin was squeezed by an outlet guide 8 so as to be sized to 1.7 mm, and was then shaped into a circular resin-impregnated fiber bundle 11 having a diameter of 1.6 mm through a suitable number of squeeze guides 9 with suitable inside diameters and through a central nozzle of a guide 10. Additional glass fibers 12 composed of long monofilaments each about 10 μm in diameter and 160 tex were led through respective resin tanks 13, impregnated with uncured unsaturated polyester resin containing styrene polymeric monomer, and were arranged longitudinally around the fiber bundle 11 after being squeezed and converged through a squeeze guide 14 and outer holes of the guide 10. The assembly was then shaped by a squeeze nozzle 15 into an uncured rod-like molding 16 about 2 mm in diameter.

Next, this uncured rod-like molding 16 was introduced into a crosshead 17 and sheathed with molten fluorinated ethylene propylene ("FEP" made by Mitsui-Dupont Fluorochemical Co., Ltd.), which was extruded from an annular die 18 heated to 370° C. and having an inner diameter of 10 mm, an outer diameter of 12 mm and a 45° nozzle angle, at a reduced pressure of about 30 mm column of water. It is preferable in improving dimensional accuracy of a cured FRP rod-like molding to set a draft rate $A_1^2 - A_2^2 / B_1^2 - B_2^2$ in the range of 30 to 150, and a draft balance $(A_1/B_1)/(A_2/B_2)$ in the range of 0.95 to 1.05, $A_1$ and $A_2$ being respectively the outer and inner diameters of the die 18, while outer and inner diameters of a sheathing layer are indicated by $B_1$ and $B_2$, respectively. In Example 1 as shown in FIG. 3, the draft rate and draft balance respectively were set at 100 and 1. Further, a point D where the molten resin 29 came into contact with the uncured rod-like molding was 27 mm away, along the axis, from the die face 18a and the contact angle θ was set at 10.2°. The rod-like molding was introduced into a cooling tank 19 at the point D and was passed through cooling tank 19 during which the resin 29 was cooled and solidified to form a semi-finished product 20 having the outer sheathing layer 0.15 mm in thickness and the uncured inner portion.

Then, this semi-finished product 20 was led into a curing tank 21 heated to 145° C. at a vapor pressure of 4.2 kg/cm² where the inner thermosetting resin was hardened. Thereafter, the FEP sheathing layer was cut and stripped away by means of a stripping device 22 having a sharp cutting edge, so that there was obtained a final product 24 in which the FRP surface was exposed, the final product being wound on a drum (not shown) through a take-up device 23.

The product 24 thus obtained, that is the FRP-sheathed multi-core optical fiber cords, had a dimensional accuracy in the range of 2±0.02 mm in diameter, and a smooth surface where the thermosetting resin was concentrated. Tests were carried out and indicated that the increase of transmission loss of the optical fiber due to the FRP sheathing was in the range of 0 to 0.1 dB/km at a wavelength of 0.85 μm and also 0 to 0.1 dB/km at the a wavelength of 1.3 μm, and that crushing strength measured for a 50 mm length of the product 24 was 40 kg when compression was applied thereto at a rate of 1 mm/min. These test results show that the product 24 can be put to practical use as a multi-core optical fiber cable in an overhead earth-wire.

Comparative Example 1

For comparison with Example 1, a product was formed in the same manner and with the same material as in Example 1 except using linear low-density polyethylene ("GRSN-7047" sold by Nippon Unicar Co., Ltd.) instead of the FEP resin. Tests revealed that products thus obtained had variations in the range of 2±0.1 mm in diameter so that these multi-core optical fiber cords, when being bent, had directionality. Further, the outer surface of the product was not satisfactorily smooth due to streaks caused by the glass fibers.

EXAMPLE 2

As shown in FIG. 2, reinforcing glass fibers 25 composed of long monofilaments, which correspond to the reinforcing glass fibers 3 of Example 1, were led through a resin tank 26 to impregnate the fibers with unsaturated polyester resin, and were shaped through a plurality of squeeze nozzles 27 into an uncured rod-like molding 28 0.4 mm in diameter. This molding 28 was introduced into the crosshead 17 and was sheathed with the same FEP as Example 1 which was extruded from the annular die 18 heated to 370° C. and having an inner diameter of 4.5 mm, an outer diameter of 6.5 mm and a 45° nozzle angle, at reduced pressure of about 30 mm column of water. The assembly was then led through a cooling tank (not shown), and there was obtained a sheathing layer 0.1 mm in thickness. In this example, the draft rate and draft balance were respectively set to 110 and 0.96, with the contact angle θ being 7.0° and the contact point D being 24 mm away from the die face 18a. A rod-like product of 0.4 mm in diameter containing 60 vol % glass fibers was finally obtained by curing the thermosetting resin, and then cutting and stripping off the FEP sheathing layer as in Example 1. This product had a dimensional accuracy in the range of ±0.02 mm and a weight per unit length of 0.25 g/m. A specimen having a length of 150 mm was prepared for measurement of its properties and was found to have a tensile strength of 23 kg at a tensile rate of 5 mm/min. and a tensile elastic modulus of 5100 kg/mm². When this product is used as, for example, a center of an optical fiber unit composed of plural optical fiber elements or is disposed in an outer peripheral part thereof, temperature resistance and tensile properties of the optical fiber unit can be improved. Also, by arranging a number of these products longitudinally on the outer periphery of an optical fiber element, or by winding them thereon at a predetermined pitch, an optical fiber cable or optical fiber cord is obtained which can be bent in an extremely small radius bend and have an elasticity to return to a linear form against a bending force. Therefore, these products may be suitably employed as a tension member and the like which requires excellent tensile strength and elasticity.

Although the present invention has been described with reference to preferred embodiments thereof, many modifications and alterations may be made within the spirit of the invention.

What is claimed is:

1. A method for continuous molding of a rod-like product, said method comprising the steps of:

forming an uncured rod-like molding by passing reinforcing fibers impregnated with uncured thermosetting resin through a squeezing die having a predetermined shape;

extruding molten thermoplastic fluororesin in a ring shape in such a manner as to enclose said uncured rod-like molding;

forming a sheathing layer of said thermoplastic fluororesin by causing said thermoplastic fluororesin to come into contact with the outer periphery of said uncured rod-like molding at an angle between 5° and 30° and by cooling and solidifying said thermoplastic fluororesin, said cooling beginning substantially at the point of contact between said thermoplastic fluororesin and said uncured rod-like molding;

introducing said uncured rod-like molding having said sheathing layer therearound into a heated tank to thereby harden said thermosetting resin; and stripping away said sheathing layer to form a rod-like product having a surface of fiber reinforced thermosetting resin.

2. A method for continuous molding of a rod-like product as claimed in claim 1, comprising forming sheathing layer to have a thickness of 0.07 mm to 0.6 mm.

* * * * *